A. A. SEBASTIAN AND D. R. CAPES.
CARBURETER AIR INLET.
APPLICATION FILED APR. 30, 1917.
1,303,972. Patented May 20, 1919.
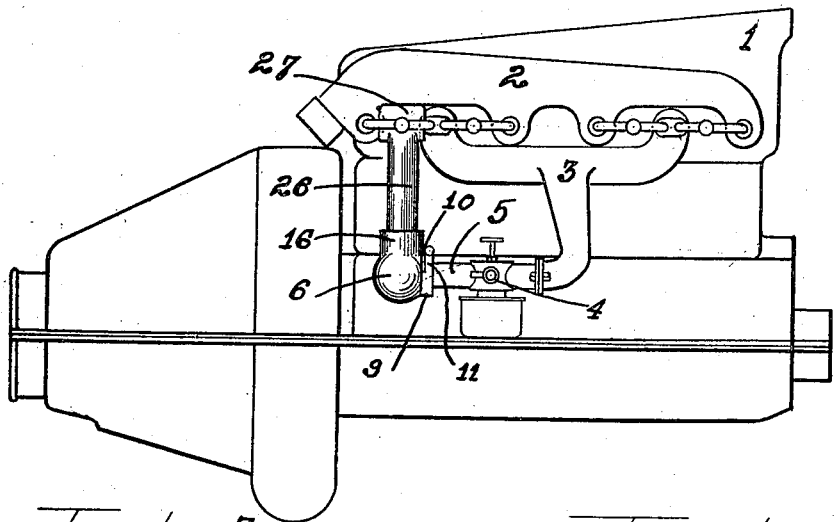
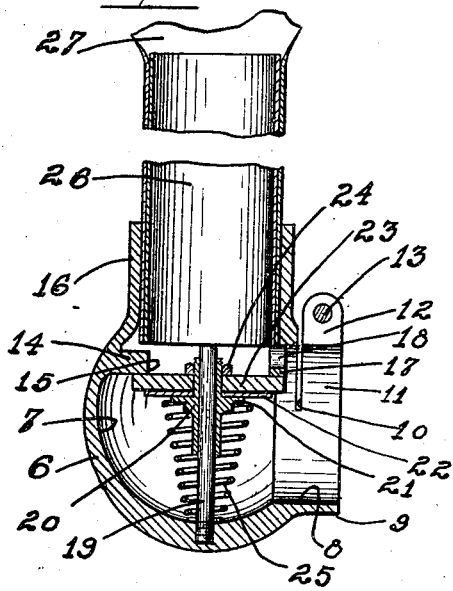
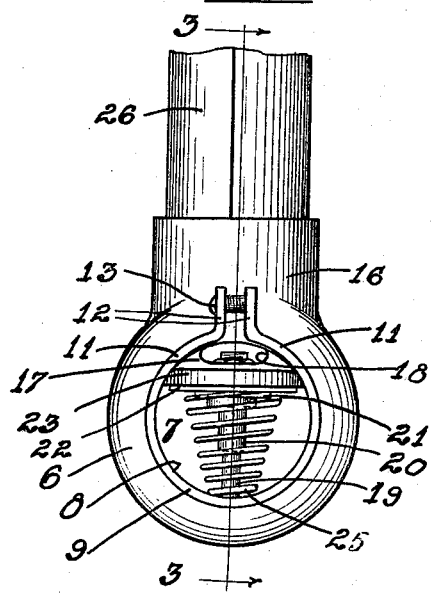
WITNESSES:
INVENTORS
Alphonse A. Sebastian
Delbert R. Capes
By
ATTORNEY

UNITED STATES PATENT OFFICE.

ALPHONSE A. SEBASTIAN AND DELBERT R. CAPES, OF CHICAGO, ILLINOIS, ASSIGNORS TO A-C MANUFACTURING COMPANY, OF CHICAGO, ILLINOIS, A CORPORATION OF ILLINOIS.

CARBURETER AIR-INLET.

1,303,972.  Specification of Letters Patent.  Patented May 20, 1919.

Application filed April 30, 1917. Serial No. 165,431.

*To all whom it may concern:*

Be it known that we, ALPHONSE A. SEBASTIAN and DELBERT R. CAPES, citizens of the United States, and residents of the city of Chicago, in the county of Cook and State of Illinois, have invented certain new and useful Improvements in Carbureter Air-Inlets; and we do hereby declare that the following is a full, clear, and exact description of the same, reference being had to the accompanying drawings, and to the numerals of reference marked thereon, which form a part of this specification.

This invention relates to an improved form of hot air inlet connection for a carbureter, wherein a baffle or heat collecting plate is connected to engage or lie closely adjacent the exhaust manifold of an engine to permit hot air to be conveyed through a stove pipe and elbow tube, said elbow tube having an automatically acting valve disposed therein, operatable by the suction of the engine to admit sufficient quantities of hot air into the carbureter, as required, through the fixed air intake thereof to properly vaporize the fuel within the carbureter.

It is an object therefore of this invention to construct a hot air outfit for a carbureter.

It is also an object of this invention to provide an automatically acting hot air supply connection for carbureters.

It is a further object of this invention to construct a hot air supply outfit wherein a valve is mounted to permit air in sufficient quantities to be supplied to a carbureter to properly vaporize the fuel when the carbureter is suddenly operated.

It is furthermore an object of this invention to produce an improved form of hot air supply connection for a carbureter connected with the exhaust manifold of an engine and with the carbureter, having an elbow tube forming a part thereof wherein an automatically acting valve is mounted for supplying hot air to the carbureter in sufficient quantities to vaporize the fuel under abnormal operating conditions of the carbureter.

It is also an important object of this invention to provide an improved form of hot air connection for carbureters, simple and of effective construction, wherein an automatic suction operated valve is mounted to supply hot air to a carbureter to properly vaporize the fuel.

Other and further important objects of the invention will be apparent from the disclosure in the drawings and specification.

The invention (in a preferred form) is illustrated in the drawings and hereinafter more fully described.

On the drawings:

Figure 1 is a side elevational view of an automobile engine having a hot air connection thereon embodying the principles of this invention, connected with the carbureter and the exhaust manifold of the engine.

Fig. 2 is a front plan view of the device with the upper part of the pipe broken away.

Fig. 3 is a vertical section of the device, taken on line 3—3 of Fig. 2, with parts broken away.

As shown on the drawings:

The reference numeral 1, represents an automobile engine as a whole, having an exhaust manifold 2, and an intake manifold 3, and to the latter is rigidly connected in any suitable manner, a carbureter 4, having a fixed air intake or pipe 5, secured thereto or forming a part thereof.

The hot air outfit or connection embodying the principles of this invention comprises an elbow or right angle tube 6, having a large valve chamber 7, therein adapted to communicate with an outlet passage 8, formed by the integral horizontal or lower arm 9, of the elbow 6, said lower arm 9, having a transverse slot 10, cut in the upper half thereof to afford resilient clamping arms 11, each provided with an integral upstanding apertured lug or flange 12, to receive a locking or attaching screw 13, therein to draw the arms 11, toward one another to permit the elbow 6, to be tightly clamped upon the outer end of the fixed air intake pipe 5, of the carbureter to hold the device in position. Integrally formed on the inner wall of the elbow 6, at the upper end of the chamber 7, but below the top of the outlet passage 8, is an annular flange or seat 14, affording a large inlet passage 15, communicating between the chamber 7, and the interior of the integral upper or vertical arm 16, of said elbow. Integrally formed at right angles upon the annular flange 14, laterally across the opening leading into the outlet passage 8, above said annular flange, is a partition or wall 17, having an opening or aperture 18, therein, to provide a small air passage directly between the interior of the elbow arm 16, and the outlet passage 8, of the elbow arm 9.

Mounted within the elbow chamber 7, and axially alined with the elbow arm 16, is a guide shaft, stem or pintle 19, the lower end of which is rigidly secured in the bottom or base of the elbow 6, while the upper end is free or unsupported and extends upwardly through the inlet passage 15, to a point a short distance beyond the flange 14. Slidably mounted upon the stem 19, is a valve sleeve 20, having a flange 21, integrally formed centrally at right angles thereon, on which is seated a centrally apertured supporting plate or reinforcing disk 22, upon which is seated a leather or hard rubber centrally apertured automatic air inlet valve 23, through which the upper threaded end of the sleeve 20, projects. The valve 23, is rigidly held in position upon the reinforcing disk 22, by means of a nut 24, threaded upon the upper end of said sleeve. Seated within the chamber 7, and coiled around the stem 19, is a spiral compression spring 25, the lower end of which rests upon the bottom of the elbow 6, while the upper end thereof bears against the under surface of the sleeve flange 21, thus normally tending to hold the valve 23, tightly seated against the under surface of the annular seat flange 14, to close the large inlet passage 15.

Rigidly secured within the upper elbow arm 16, is the lower end of a pipe 26, which may be of any desired construction, and has integrally formed or rigidly secured upon the upper end thereof a heat collector or stove 27, disposed adjacent or connected with the rear end of the exhaust manifold 2, in order that the highest degree of heat may be secured from all of the engine cylinders to heat the air passing through the pipe 26, and through the valve and elbow into the carbureter, to a high temperature, thereby producing practically a perfect vaporization of the fuel within the carbureter with which said hot air comes in contact. Said pipe 26 when inserted in position rests upon and is limited in its insertion into the elbow arm 16 by the outer face of the partition or wall 17, which thereby prevents said pipe from closing in any degree the aperture 18.

The operation is as follows:

As clearly shown in Fig. 1, the hot air connection is mounted in position upon a vehicle engine by securely clamping the lower arm 9, of the elbow 6, around the fixed air intake pipe 5, of the carbureter by means of the clamps 11, and the attaching screw 13, and by connecting the stove 27, to the exhaust manifold 2, of the engine, in any suitable manner, to permit the air passing into the pipe 26, to become heated to a high temperature and to pass downwardly through said pipe, and through the small outlet passage 18, then through the passage 8, and into the carbureter 4, by way of the fixed air intake pipe 5, to mix with the gasolene in the carbureter to thoroughly vaporize the same. If, however, the suction draft through the carbureter should at any time be increased to cause extra quantities of gasolene to be forced into the carbureter, due to the speeding up of the engine or from other causes, the increased suction draft will automatically operate the valve 23, drawing the same downwardly against the action of the controlling spring 25, thereby opening up the large inlet passage 15, permitting increased quantities of hot air to flow through the elbow 6, and into the carbureter 4, to properly carburet the extra qualtities of gasolene. As soon as the suction of the engine has been reduced, the controlling spring 25, acts automatically to close the valve 23, thus permitting hot air to flow into the carbureter only through the small inlet passage 18, which is open at all times.

We are aware that the details of construction may be varied through a wide range without departing from the principles of this invention, and we therefore do not purpose limiting the patent granted otherwise than necessitated by the prior art.

We claim as our invention:

In a connection for carbureters, an elbow having a large air passage therein, means for clamping to the outlet thereof the fixed air intake of a carbureter, a valve seat flange in the inlet of said elbow, a wall formed integrally with said valve seat flange at one side thereof and having a small inlet passage therein to permit hot air to be supplied constantly to said carbureter, a valve mounted within said elbow and coöperating with said flange normally to close said large air passage and adapted to be operated automatically to open said large passage by the suction draft through the carbureter, and a pipe fitted into the inlet of said elbow and limited in its insertion therein by said wall.

In testimony whereof we have hereunto subscribed our names in the presence of two subscribing witnesses.

ALPHONSE A. SEBASTIAN.
DELBERT R. CAPES.

Witnesses:
CHARLES W. HILLS, Jr.,
EARL M. HARDINE.

Copies of this patent may be obtained for five cents each, by addressing the "Commissioner of Patents, Washington, D. C."